United States Patent
Roquemore, III (10) Patent No.: US 9,918,372 B2
(45) Date of Patent: Mar. 13, 2018

(54) LOW POWER BATTERY MODE FOR WIRELESS-ENABLED DEVICE PRIOR TO COMMISSIONING

(71) Applicant: ABL IP HOLDING LLC, Conyers, GA (US)

(72) Inventor: John Peter Roquemore, III, Suwanee, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/215,038

(22) Filed: Jul. 20, 2016

(65) Prior Publication Data

US 2018/0027632 A1 Jan. 25, 2018

(51) Int. Cl.
| | | |
|---|---|---|
| G05B 19/00 | (2006.01) |
| H05B 37/02 | (2006.01) |
| H05B 33/08 | (2006.01) |

(52) U.S. Cl.
CPC ..... *H05B 37/0272* (2013.01); *H05B 33/0842* (2013.01); *H05B 37/0227* (2013.01)

(58) Field of Classification Search
CPC ............ H05B 37/0272; H05B 37/0218; H05B 41/3922; H05B 41/325; H05B 41/32; H05B 39/042; H05B 33/0869; H05B 3/38; H05B 33/08; H05B 37/029; H05B 37/02; H05B 37/0227; H05B 39/081; Y02B 20/46; Y02B 20/14; F21V 23/0442; H01T 2/00; H01T 1/00; H01T 2/02; H01J 17/00; H01J 2893/0059; H01J 40/14; H01J 17/04; G03B 15/05; G05B 11/017; G08B 13/193

USPC ........................................................ 340/5.61
See application file for complete search history.

(56) References Cited

U.S. PATENT DOCUMENTS

| | | | |
|---|---|---|---|
| 9,320,116 B2 * | 4/2016 | Lydecker ........... | H05B 37/0227 |
| 9,655,217 B2 | 5/2017 | Recker et al. | |
| 2012/0038281 A1 * | 2/2012 | Verfuerth ........... | H05B 37/0272 315/152 |

(Continued)

FOREIGN PATENT DOCUMENTS

CN 202551449 U 11/2012

OTHER PUBLICATIONS

Bluetooth SIG, Inc., "Security, Bluetooth Smart (Low Energy),"© 2016 Bluetooth SIG, Inc., https://developer.bluetooth.org/TechnologyOverview/Pages/LE-Security.aspx, downloaded Jul. 15, 2016.

(Continued)

*Primary Examiner* — Minh D A
(74) *Attorney, Agent, or Firm* — RatnerPrestia (57) ABSTRACT

The wireless lighting control device examples conserve battery power before installation and/or commissioning. To save battery life, such a device remains in a low power mode and is awakened for commissioning, for example, by a button press (e.g. for a wall switch) or motion or audio sensing (e.g. for an occupancy sensor or the like). When awakened, the lighting control device enters its commissioning mode with the radio transceiver active for a short period of time. If the lighting control device is not commissioned within that time interval, for example, it may reenter the sleep mode. Conversely, if successfully commissioned during the active time period, the lighting control device is ready for normal operations.

21 Claims, 5 Drawing Sheets

(56) References Cited

U.S. PATENT DOCUMENTS

2015/0223310 A1 8/2015 Steiner et al.
2015/0226001 A1 8/2015 Adams et al.

OTHER PUBLICATIONS

Silicon Laboratories, Inc., "EFR32xG1 Wireless Gecko Reference Manual," Preliminary Rev. 0.6, pp. 1-12, 186-193, 968-993, http://www.silabs.com/Support%20Documents/TechnicalDocs/EFR32-ReferenceManual.pdf, dated Jul. 8, 2016.
Notice of Allowance and Fee(s) Due dated Oct. 23, 2017 in U.S. Appl. No. 15/715,490 (13 pages).
Canadian Examination Report dated Dec. 20, 2017 in Canadian Patent Application No. 2,973,755, 5 pages.

* cited by examiner

LOW POWER BATTERY MODE FOR WIRELESS-ENABLED DEVICE PRIOR TO COMMISSIONING

TECHNICAL FIELD

The disclosed subject matter relates to a battery powered control device, for example, for wirelessly controlling a luminaire or the like. More specifically, the control device conserves battery power by entering and/or remaining in a low power mode before a wake-up operation activates the device to allow for commissioning.

BACKGROUND

Recently, battery powered devices (e.g. switches, sensors, etc.) have been developed to control luminaires, for example, using wireless communications with the controlled devices. In order to conserve battery life between manufacturing of the control device and installation of the control device, conventional solutions have physically disconnected the battery from the electronics of the control device, typically, in one of two configurations.

In a first configuration, a non-conductive pull-tab is inserted (during manufacturing) between the batteries and one or more of the power terminals of the device itself. In order to install these types of control devices and enable normal operation, the installer has to physically pull the tab out for the device to become powered for the first time.

In a second configuration, batteries are simply not included in the device during the manufacturing process. In order to install these types of control devices, the installer has to physically insert batteries into the device for the device to become powered for the first time.

SUMMARY

There is room for improvement over the typical configurations outlined above.

Examples are disclosed of battery powered wireless lighting control devices. In an example, the device has a battery, a processor, a radio frequency (RF) transceiver and at least one of a detector or a button for user activation. The processor is configured to operate the wireless lighting control device to remain in a deep sleep mode, which consumes minimal power from the battery, until the processor receives a trigger signal from the detector or the button indicating a predetermined stimulus from a user. In response to the trigger, the processor wakes the device from the deep sleep mode; and while awake, the device consumes the power from the battery. The device performs wireless commissioning of the lighting control device by powering the RF transceiver and wirelessly transmitting a beacon to a commissioning device and wirelessly receiving a commissioning message from the commissioning device. The message enables the control device to wirelessly communicate with a luminaire or other element of a wirelessly controlled lighting system. The device, for example, may be able to provide wireless control of the luminaire through the RF transceiver after the commissioning process is performed.

Examples in the disclosure encompass a variety of different types of lighting control devices. Specific examples include battery powered wireless wall switches and include battery powered wireless occupancy sensors. The wall switch example includes the button, e.g. for user activation. In that example, wake up may be responsive to a simple button activation or responsive to a particular button operation, e.g. press and hold of the button for some period. The occupancy sensor example includes an appropriate detector. In that sensor example, wake up may occur when the detector has detected a predetermined stimulus from a user, such as detection of movement or detection of a particular motion (e.g. pattern or gesture or the like) and/or a detection of a combination of sensed conditions/events if the device has more than one sensor (e.g. combination of detection of motion and a particular sound).

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to battery powered lighting control devices, such as a wireless wall switch or a wireless sensor (e.g. for occupancy sensing). The examples conserve battery power and extend battery life by entering or remaining in a very low power mode before commission. While in that mode, a lighting control device example is awakened only by detection of a predetermined stimulus, such as a button press for a wall switch or detection of some motion by an occupancy sensor.

The first prior configuration outlined in the background, using the non-conductive pull tab to conserve battery power before installation, is potentially error prone because it allows the tab to be prematurely pulled out therefore wasting precious battery life. If there is a problem pulling out the tab, e.g. due to tearing, the tab pull may leave a non-conductive remnant between contacts and thereby prevent battery connection after the pull. This type error may prevent activation of the control device, which in turn causes difficulties/added expense if the control device fails to operate at or following installation. The non-conductive pull tab configuration also is expensive as the cost to make and install the tab adds to the overall cost of the control device.

The prior technique relying on battery insertion at installation to conserving battery power is labor intensive due to the installer having to manually install batteries in every device during installation. Errors may also arise if the installer does not insert the batteries in the correct orientation or damages one or more of the connection terminals of the control device during the battery installation process.

Also, the typical techniques disconnect the battery only until the time of installation at a premises where the control device will operate. Once installed, the electronics may consume power. The lighting system as a whole, with active ability of a wall switch or sensor to control other devices (e.g. luminaires), may not be operational for some further period, for example, until luminaires are installed and the luminaires and the control device are commissioned to communicate and work together. In such a scenario, the control device electronics have unnecessarily consumed power during the time between installation and commissioning.

Examples are discussed below that improve on techniques to conserve battery power of a wireless lighting control device, for example, before installation and/or before commissioning, in a manner to alleviate one or more of the deficiencies outlined above. To save battery life, a wireless battery operated control device remains in a low power mode and is awakened for commissioning, for example by a button press (e.g. for a wall switch) or motion or audio sensing (e.g. for an occupancy sensor or the like). When awakened, the control device enters its commissioning mode with the radio transceiver active, e.g. for a short period of time. If the lighting control device is not commissioned within that time interval, it may reenter the sleep mode. Conversely, if successfully commissioned during the active time period, the lighting control device is ready for normal operations.

With the temporary activation, based on a button press or condition sensing, batteries can be installed and fully connected during manufacture. There is no need to install batteries in the control device at the installation site and no battery tabs to remember to pull or to pull without damaging before installation and operation. The button press or condition sensing approach may also allow an installer to stimulate the lighting control device and see some pilot light activity to confirm that the control device is functional, yet the lighting control device can reenter its sleep mode and conserve power until someone else commissions the device, possibly at a much later time.

As outlined above, the lighting control device with the battery power conservation feature may be used to control operation of luminaires. Luminaires (e.g. light fixtures, floor or table lamps, or other types of lighting devices for artificial illumination) are widely used in various residential, commercial and industrial settings for providing illumination in both interior and exterior spaces. For example, a retail store may install multiple luminaires in the ceiling for illuminating products and walking area throughout store. The luminaires discussed in the examples may be installed or otherwise located in our about a particular premises. Although the premises may be a single property and associated building structure, the term premises is used in the examples to also encompass installations and/or operations of the luminaires at more than a single site or building, such as campus.

The term "luminaire" as used herein is intended to encompass essentially any type of device that processes power to generate light, for example, for illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition light for an organism. A luminaire, for example, may take the form of a table lamp, ceiling light fixture or other lighting device that incorporates a source, where the source by itself contains no intelligence or communication capability (e.g. LEDs or the like, or lamp ("regular light bulbs") of any suitable type). Alternatively, a lighting device or luminaire may be relatively dumb but include a source device (e.g. a "light bulb") that incorporates the intelligence and communication capabilities described herein. In most examples, the luminaire(s) illuminate a service area to a level useful for a human in or passing through the space, e.g. regular illumination of a room or corridor in a building or of an outdoor space such as a street, sidewalk, parking lot or performance premises served by a lighting system may have other lighting purposes, such as signage for an entrance or to indicate an exit. Of course, the luminaires may be configured for still other purposes, e.g. to benefit human or non-human organisms or to repel or even impair certain organisms or individuals.

The lighting control devices implementing the battery conservation feature examples as described herein may be battery powered wireless wall switches, battery powered wireless occupancy sensors, battery powered wireless sensors configured to detect other lighting related conditions (e.g. ambient light characteristics) or other types of control devices configured to wirelessly communicate with lighting system elements about events or the like as may impact control of system luminaires. As outlined above, each luminaire includes a light source. The light source may be any type of light emitting unit, including but not limited to light emitting diodes (LEDs), incandescent or fluorescent lamps, halogen or halide lamps, neon tubes, etc. In the examples described herein, the luminaires also have smart capabilities. For example, the luminaires include a processor as well as radio frequency (RF) transceivers to perform wireless communications with other luminaires and other wireless devices (e.g. Wall Switches, Sensors, Smartphones, Access Points, etc.). To work with and control such luminaires in a controlled lighting system, a wall switch or sensor type lighting control device typically includes a compatible RF transceiver. The lighting control device may also include a processor, memory and firmware or other programming to configure the lighting control device to operate as outlined herein.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

Figure 1:
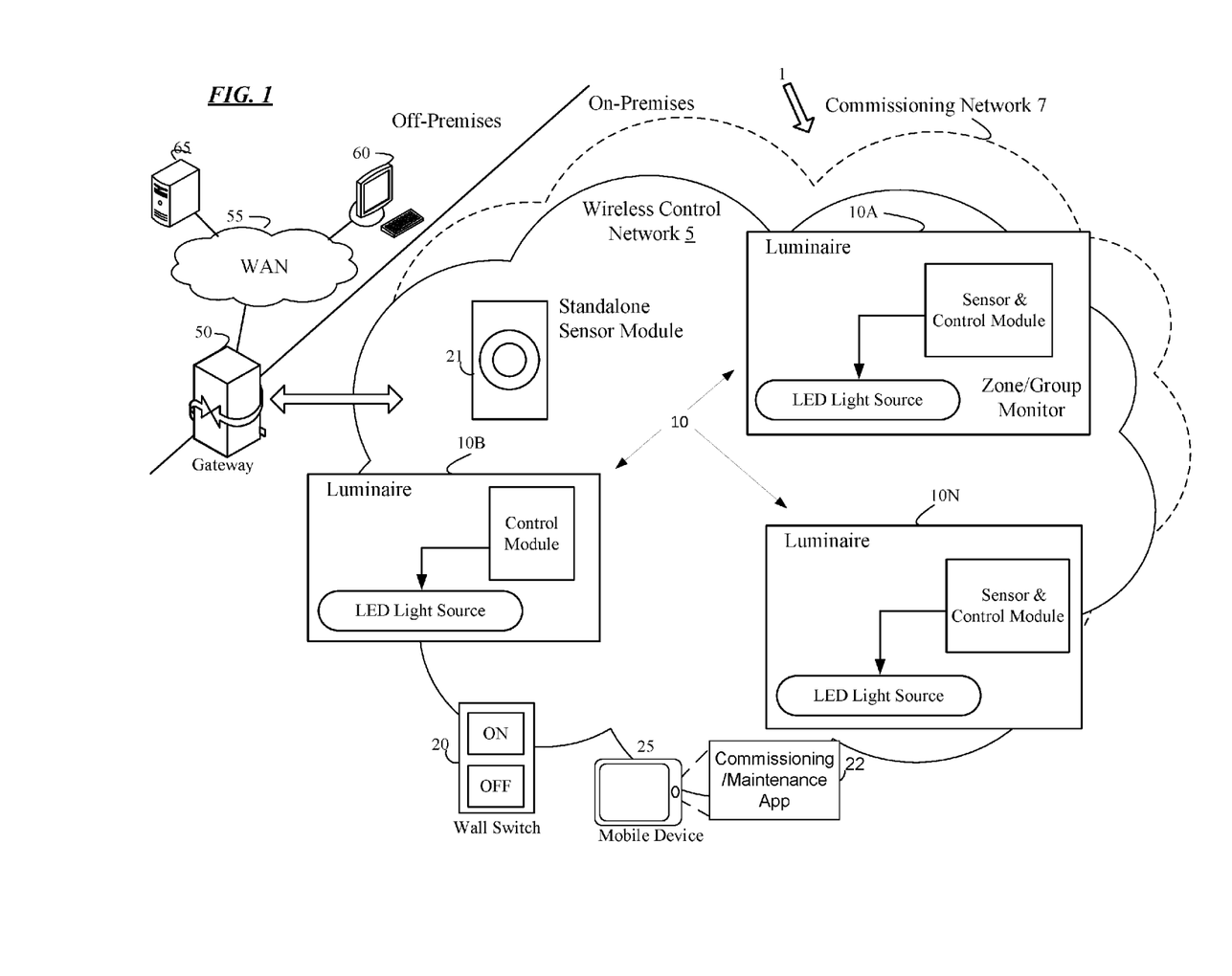
FIG. 1 is a high-level functional block diagram of a system of one or more communication networks between luminaires, battery powered lighting control devices, and other network enabled devices for use in or communication with a lighting control system.

Reference now is made in detail to the examples illustrated in the accompanying drawings and discussed below. To appreciate the pre-commissioning battery saver feature, in context, it may be helpful to first consider an example of a lighting control system using wireless communications, in which some of the wireless enabled lighting control devices use battery power. FIG. 1 illustrates examples of some elements of a wirelessly controlled lighting system 1 as well as examples of some other network enabled devices for use in or for communication with the lighting control system 1.

The lighting system 1 example of FIG. 1 includes one or more luminaires 10A to 10N installed in a premises location (e.g. residential/commercial setting). In this example, each of the luminaires 10 includes a light source as well as a lighting control device, where the lighting control device is represented by a sensor and control module in the examples of luminaires 10A and 10N or by a control module (without its own sensor) in the example of luminaire 10B. The lighting control device for a luminaire may be incorporated within the respective luminaire as shown, or such a device may be implemented separately and coupled to control the respective luminaire. Although shown as one such control device/module for each luminaire, any one of these lighting control devices/modules may be coupled to two or more luminaires (e.g. if the control device is implemented as a power pack or plug load controller). Such lighting control devices in or associated with luminaire 10 are configured to communicate with each other and/or with other lighting control devices represented in the drawing by wall switch 20 and standalone sensor 21.

The concepts discussed herein are applicable to devices of a lighting system 1 that utilizes a single communication channel or band, for example, in which the lighting control devices have transceivers configured to operate over a single channel or band. The concepts, however, are applicable to systems and devices that utilize a larger number of channels, possibly in two or more RF bands. Hence, in the example of FIG. 1, luminaires 10, wall switch 20, sensor 21 and any other lighting control devices (such as plug load controllers and power packs) communicate control related messages over a control band forming a logical wireless control network 5. In specific examples discussed in more detail later, the wireless control network 5 uses a 900 MHz (sub-GHz) frequency band. In such a multi-band example, the system also uses one or more different channels or bands to form a logical wireless commissioning network 7. In specific examples discussed in more detail later, the wireless commissioning network 7 uses a 2.4 GHz, such as the band assigned for BlueTooth Low Energy (BLE). In such an implementation, a variety of control messages are transmitted over the band of the wireless control network 5, including, for example, messages to turn lights on/off and possibly to dim lights up/down, set scene (e.g., a predetermined light setting), and to indicate sensor trip events. The other band, used for the commissioning network 7 in the example, carries various messages related to commissioning and maintenance of the wireless lighting system 1; however no control messages pass over this commissioning network. Logically, the communications over the control band and the commissioning band may be thought of/referred to as a wireless control network 5 and a wireless commissioning network 7.

When the system 1 is fully operational, each lighting control device 10, 20, 21 wirelessly sends and/or receives lighting control related messages over the wireless control network 5. Before such normal operations, however, each lighting control device 10, 20, 21 is commissioned to operate as an element of the system 1 via communications over the wireless commissioning network 7. In the example shown, the system 1 is provisioned with a mobile device 25 that includes a commissioning/maintenance application 22 for commissioning and maintenance functions of the lighting control system 1. For example, the mobile device 25 enables mobile commissioning, configuration, and maintenance functions. The mobile device 25 may be a tablet, PDA or smartphone type of device with human interfacing mechanisms sufficient to perform clear and uncluttered user directed operations. The mobile device 25 runs mobile type applications, including the commissioning/maintenance application 22 on iOS7, Android KitKat, Windows 10 operating system or the like. Execution of the commissioning/maintenance application 22 on the mobile device 25 supports commissioning of devices for operation as elements of the lighting system 1.

In addition to luminaires 10A to 10N, wall switch 20 and sensor 21, a gateway 50 may also be in communication with wireless control network 15 and/or the commissioning network 7. If provided, such a gateway 50 allows a luminaire, any standalone sensors and wall switch(es) to communicate with external devices such as server 65 and personal computer or other user terminal device 60 via a wide area network (WAN) 55. This configuration could essentially allow a server 65 or terminal device 60 to commission, monitor and/or control the luminaires, sensor(s) and wall switch(es) 106 at the premises.

Web enabled (cloud) services for facilitating commissioning and maintenance activities also may be provided via the mobile device 25. The commissioning/maintenance application 22 of the mobile commissioning device 25 interfaces with the cloud services via the gateway 50 and the WAN 55 to acquire installation and configuration information for upload to luminaires 10, wall switches 20, sensors 21, etc. The installation and configuration information is received by mobile device 25 from the gateway 55.

After the installer (e.g. electrician) initially installs luminaires 10, sensor 21 and wall switch 20, the luminaires 10 are powered from the AC mains at the premises. Battery powered control devices such as the sensor 21 and the wall switch 20, however, remain for long periods in the deep sleep mode awaiting activation for commissioning. The same or a different technician initiates a pairing and commissioning process to configure the system to support wireless communications for normal lighting control, e.g. between the lighting control devices 20, 21 and the luminaires 10. The pairing and commissioning process, for example, may involve an individual Bluetooth pairing of a mobile device 25 (e.g. a tablet or smartphone) with each system element 10, 20, 21 to enable communications related to commissioning. For battery powered wireless lighting control devices, such as the sensor 21 and the wall switch 20, this involves input of a predetermined stimulus to wake each such device from its deep sleep mode for pairing with the mobile commissioning device 25 in the example.

At a high level, the commissioning of the elements 10, 20, 21 during respective paired communications essentially enables the technician to configure each of the various elements so as to create a relationship between the battery powered wireless lighting control devices 20, 21 and the luminaires 10 that allows for wireless control of the luminaires 10 after successful commissioning. For example, once the commissioning process is properly complete, sensor 21 or wall switch 20 will be able to control (e.g. turn ON/OFF) some number N luminaires 10 (10A-10N in the drawing) automatically, by sensing occupancy or by detecting a user request via button operation.

In a more specific example, for a system encompassing a number of rooms or other areas of a premises, groups of system elements are formed during commissioning of the lighting control system. All members of a group are logically connected together over the control band of the wireless control network, which in our example is a sub-GHz control network. A group may be defined by an assigned RF channel and a lighting control group identifier. In such an implementation, the luminaires and control devices of the group subscribe to group communication "channels" defined by assigned RF channel and assigned group ID. Effectively, the system elements in the group only listen for/react to messages on the RF channel with the identifier (ID) of the subscribed group channel that designate the lighting control group of which each control device in a luminaire 10 or other wireless lighting control device 20 or 21 is a member. A group can be further divided to address control to specific control zones within the group defined by a control zone identifier. Zone communications are managed as addressable features at run time.

Each lighting control group will have a group monitor or manger. Typically, one of the luminaires is commissioned as the group monitor, and one or more of the other luminaires are commissioned to take over the group monitor functions in the event of failure of a designated group monitor. The configuration of luminaires as group monitor and backup(s) is part of the process for commissioning the luminaires 10A to 10N in the group.

Due to limited available full-power operation times due to battery power limitations, lighting control devices such as wall switch 20 and sensor 21, are not commissioned to act as the group monitor in the example. The lighting control devices 20, 21, however, are commissioned to communicate with the active group monitor as well as other luminaires in the particular group. Further discussions will concentrate on control device wake-up and commissioning, e.g. for such group control operations.

The wireless control network 5 distributes control messages and events, network management messages and events, health and failover events; and the commissioning network 7 distributes messages about commissioning and maintenance communications, such as firmware update distributions and group membership changes. Of note for purposes of further discussion of installation and commissioning, the commissioning process configures the group members to listen to/use the RF channel and ID of the group, configures luminaires as the group manager and possible backup(s) and configures other group members to communicate with the group monitor. Since the luminaires draw power from AC mains, the transceivers and control electronics can be adequately powered at all times before, during and after commissioning. Battery powered devices, however, operate in one or more low power modes at different times to conserve battery power. In particular, battery powered wireless lighting control devices, such as sensor 21 and wall switch 20, frequently operate in or remain in a deep sleep mode (minimal power consumption state) until awakened for commissioning.

For example, if the battery powered wireless lighting control device is a wall switch 20 that includes a button, a user press of the button generates the trigger signal that stimulates the processor to wake up the wall switch 20 from the deep sleep mode. Once commissioned, the processor responds to user activation of the button to control the luminaire(s) 10 in the assigned group to turn ON/OFF. If the control device is an occupancy sensor 21, the device includes an appropriate detector, which in this example, is configured to detect motion. In that case, the processor of device is configured to wake up the occupancy sensor from the deep sleep mode upon suitable motion detection, and once commissioned, to control the luminaire(s) 10 in the assigned group to turn ON based on further detected motion. Luminaires may turn OFF if there is no indication of occupancy from such a sensor for some set period of time.

In the examples, the battery powered wireless lighting control device may be configured for surface mounting on or recessed mounting in a wall or other architectural panel of a premises to be illuminated by the lighting system. A wall switch 20 often is mounted to a wall, for convenient user access. An occupancy sensor 21 or the like may be similarly wall mounted but often is mounted on a ceiling or the like.

Batteries may be installed and fully connected to the electronics of the lighting control device 20 or 21 as part of the manufacturing process. The processor is configured to keep the device in the deep sleep mode from manufacturing of the battery powered wireless lighting control device, for example, until activated in expectation of commissioning.

The processor may transition the device 20 or 21 back to the deep sleep mode, for example, in the event a wake-up fails to result in a successful commissioning of the device. In a more specific example, the processor transitions the device 20 or 21 back to the deep sleep mode at a predetermined time interval after wake-up in event of no commissioning of the device before expiration of the predetermined time interval.

In operation examples, upon awakening from the deep sleep mode, the processor and the RF transceiver consume battery power necessary to complete the commissioning of the device. Upon successful commissioning of the device, however, the device including the processor and the RF transceiver, enters a normal lighting control mode awaiting a lighting related input via the detector or the button. In the example, the lighting control device enters its normal operating state for wireless lighting control functions once commissioned; although in that normal operation mode, the device uses various power states to perform the necessary actions yet preserve battery life. One power state within normal operations will be a full ON mode in which all elements/functions of the lighting control device are powered and actively available. One other state that may be entered at various times of normal (post commissioned) operations may be a somewhat low power state awaiting a button press or condition sensing, in response to which the device will power up the appropriate transceiver for control signal transmissions. The normal operation low power state, however, may or may not be as low in power consumption as the deep sleep mode before commissioning.

Figure 2:
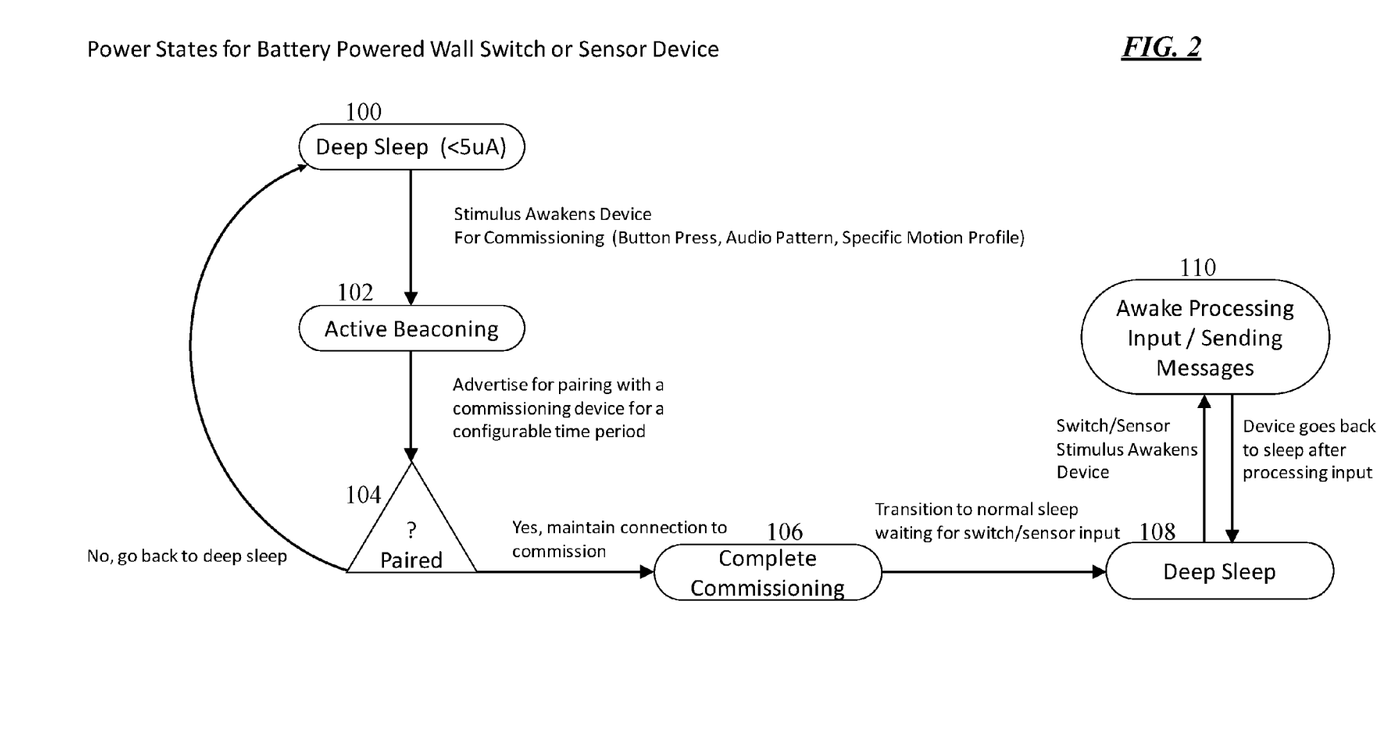
FIG. 2 is a flow chart/state diagram that may be helpful in explaining operation of a battery powered wireless lighting control device, such as a wall switch or a standalone sensor, in a system like that in FIG. 1.

It may be helpful to consider the states and process of such a lighting control device in somewhat more detail, with reference to the diagram of FIG. 2.

In step 100, the wall switch 20 and/or sensor 21 is initially operating in a deep sleep mode, for example, consuming current less than or equal to 5 micro-amperes. In some examples, the battery powered lighting control device may consume less than 1 micro-amps of current. This deep sleep mode is set during manufacturing of the switch and/or sensor. In order to be awoken from this deep sleep mode, a stimulus must be input to the respective device. The wall switch 20, for example, therefore may only consume power if any needed only to detect activation of the push button. The sensor, for example, may only consume sufficient power to operate a timer to infrequently wake up enough of the device functions to operate the detector to sense for motion detection in the vicinity of the lighting control device. Stimulus for wake-up, for example, may involve detection of a button press, detection of an audio condition or pattern, detection of motion, detection of a specific motion profile (e.g. gesture or the like).

By way of somewhat more detailed examples, a button on a wall switch 20 must be pressed or pressed and held for a predetermined time period; or a sensor 21 must detect some type of motion in its vicinity to be awoken from deep sleep. This type of stimulus will wake the wall switch 20 or the sensor 21 respectively from the deep sleep mode such that the respective device can transmit an active beacon in step 102 (i.e. the processor of the lighting control device applies power to the BlueTooth RF transceiver of the lighting control device). This active beacon is a wireless transmission of an advertising packet or the like to indicate to other Bluetooth enabled devices in the vicinity that the wall switch 20 or sensor 21 is attempting to essentially connect (i.e., pair itself) with another device. Although referred to in the singular as a beacon, it should be understood that the advertising packet or other signal transmission for this purpose may be transmitted a number of times (e.g. around 5 to 10 times per second) for some period while the transceiver is in the mode looking for a device with which to pair, for commissioning purposes at this point in our example. Luminaires and other wall switches 20 and/or sensor 21 will not respond to the pairing request/advertisement, however, a Bluetooth enabled mobile device 25 of a technician seeking to commission the wall switch 20 and/or sensor 21 may respond.

The wall switch 20 or the sensor 21 (after transmitting the active beacon) determines in step 104 if it has been paired with a commissioning device 25. If it is paired successfully, then processor of the lighting control device 20 or 21 completes a commissioning process in step 106 by exchanging information (identity information, etc.) with the commissioning device 25. Although not shown in the flow diagram for the control device states in FIG. 2, each luminaire will go through its own pairing and commissioning procedure. After the commissioning process takes place for all elements of the particular zone or group, the wall switch 20 and/or the sensor 21 is now configured to control the luminaires 10A to 10N in the group.

Once commissioned, the wall switch 20 and/or the sensor 21 enters a normal sleep mode in step 108 and awaits an input stimulus before it awakes and performs its normal lighting control functions in step 110. For example, after the commissioning process, the wall switch 20 may wake up due to one of the buttons being pressed in order to turn ON/OFF or other operations (e.g. dimming, scene selection, programming, etc.) of the luminaires 10A to 10N of the particular group. Similarly, the sensor 21, upon detecting motion via the infrared detector or the like, may transmit a control signal to turn ON/OFF luminaires 10A to 10N of the particular group. It should also be noted that each commissioned battery powered lighting control device 20 or 21 may wake up periodically, for example, to check for changes such as firmware updates or other messages held for the control device by the group monitor. The normal sleep mode may consume somewhat more power than the deep sleep mode implemented prior to commissioning, particularly when considered over an interval of time that may involve more frequent wake-ups for check-in, in comparison to the deep sleep mode before commissioning.

To fully appreciate the present concepts, it may be useful to discuss examples of the luminaires, wall switches and sensors in somewhat more detail.

Figure 3:
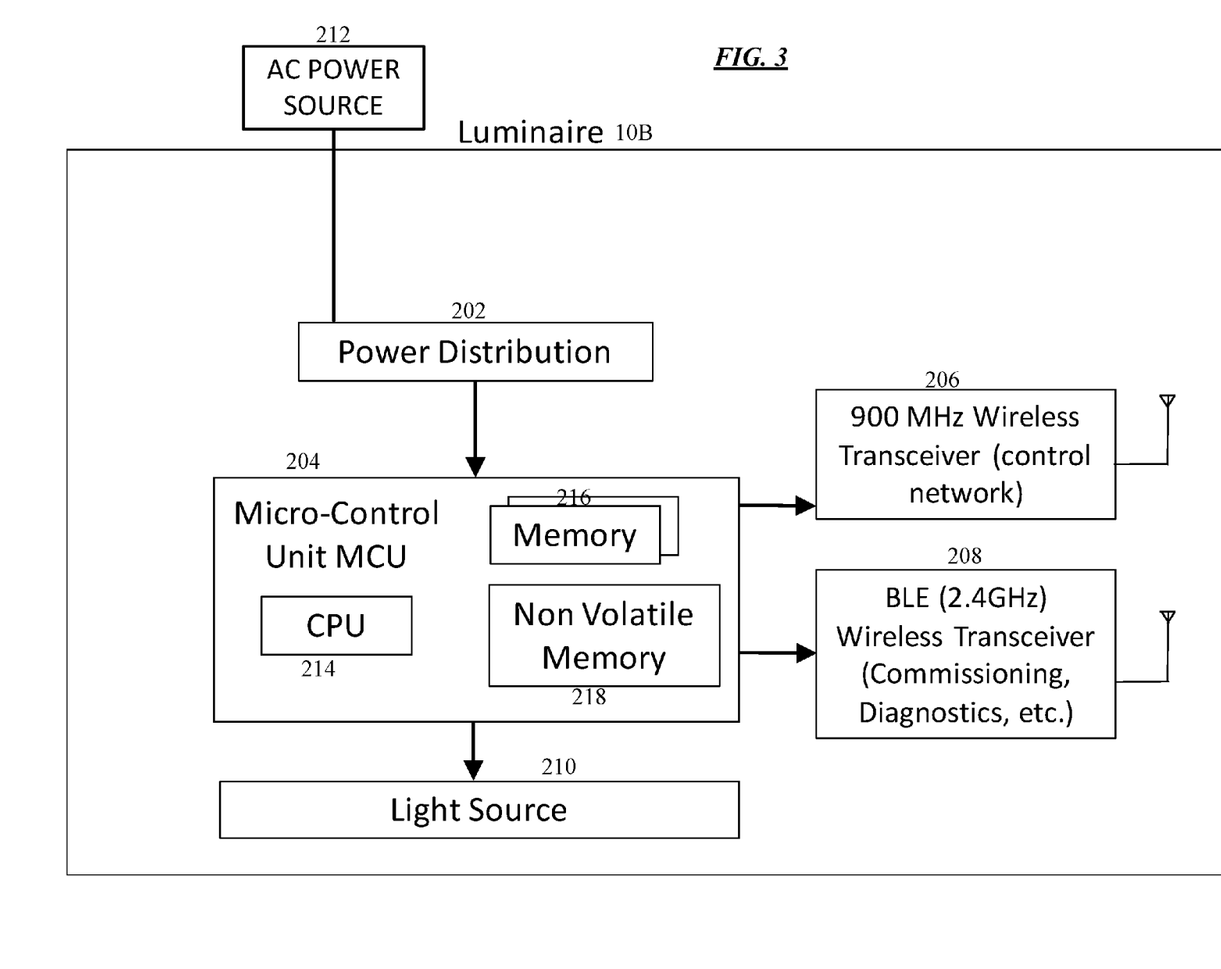
FIG. 3 shows a block diagram of the internal components of an example of a luminaire as may be used in the system in FIG. 1.

An example of a luminaire 10B is shown in FIG. 3 where the luminaire 10B includes a light source 210, a microcontroller unit (MCU) 204 that has an internal processor configured as a central processing unit (CPU) 214, a memory 216 and a non-volatile memory 218. The processor and associated memory in the example 10B of the luminaire are components of the MCU, which is a microchip device that incorporates the CPU as well as one or more memories. The MCU may be thought of as a small computer or computer like device formed on a single chip. Alternatively, the processor and memory may be implemented as separate components, e.g. by a microprocessor, ROM, RAM, flash memory, etc.

Also included in the example 10B of the luminaire is a power distribution unit 202 receiving power from an external alternating current (AC) power source 212. A driver for the light source may be provided, e.g. to convert mains power to suitable voltage and current levels for the particular type of source, although the driver is omitted from FIG. 3 for convenience.

This example of the luminaire 10B includes the capabilities to communicate over two different radio frequency (RF) bands, although the concepts discussed herein are applicable to control devices that communicate with luminaires and other system elements via a single RF band. Hence, in the example, the luminaire 10B includes a 900 MHz transceiver 206 for sending/receiving control signals, as well as a 2.4 GHz transceiver 208 (e.g. BlueTooth Low Energy (BLE)) for sending/receiving pairing and commissioning messages. In such an implementation a variety of controls are transmitted over the 900 MHz control band of the wireless control network 5, including, for example, turn lights on/off, dim up/down, set scene (e.g., a predetermined light setting), and sensor trip events. The other band, 2.4 GHz for BLE in the example, carries various messages related to commissioning and maintenance of the wireless lighting system, however no controls pass over this commissioning network 7.

Although the two RF transceivers and the MCU are shown separately, the elements of the luminaire may be implemented in a more integrated manner, e.g. with the RF transceivers integrated into the MCU 204, with one RF transceiver for multiple bands, with the MCU implemented as an integral component of one or the other of the RF transceivers, etc.

In the example of FIG. 3, luminaire 10B is shown as having one processor 214, for convenience. In some instances, such a lighting device may have multiple processors. For example, a particular device configuration may utilize a multi-core processor architecture. Also, some of the other components, such as the communications interfaces, may themselves include processors.

The lighting control device or module of the luminaire 10B includes the MCU 204 (with the processor and memory) as well as the wireless transceiver(s). If the module also operated as a sensor, such a lighting control device would also include a detector and associated circuitry to operate the particular detector and interface the detector to the MCU 204.

In general, the MCU 204 of the lighting control device in the luminaire 10B controls the various components of the luminaire. For example, MCU 204 controls RF transceivers 206 and 208 to communicate with other RF devices (e.g. wall switches, sensors, commissioning device, etc.). In addition, the MCU 204 controls the light source 210 to turn ON/OFF automatically, or at the request of a user. In addition, MCU 204 controls other aspects of operation of the light source 210, such as light output intensity level, associated color characteristic(s) of the light output, focus and/or beam steering of the light output, etc.

Figure 4:
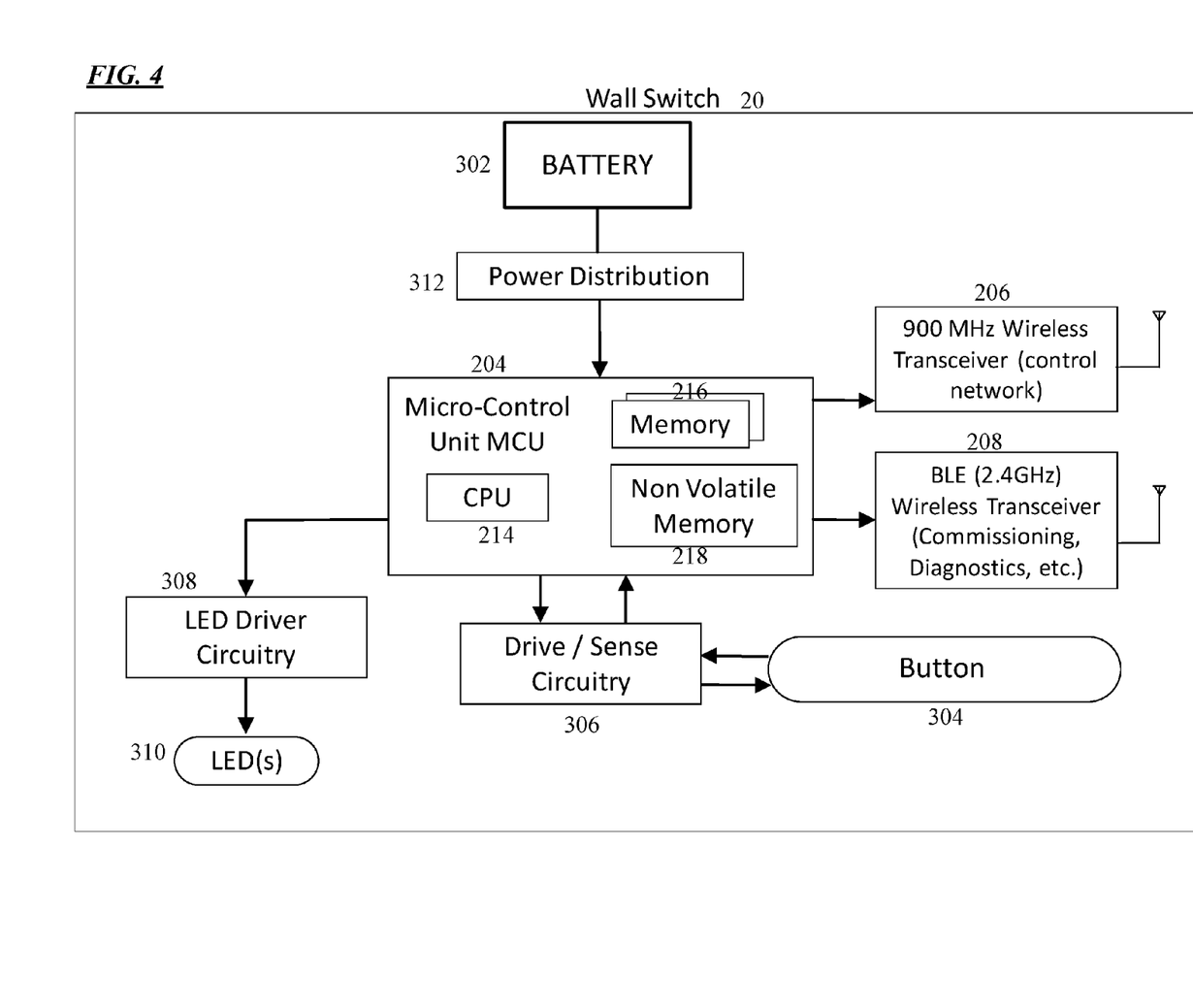
FIG. 4 shows a block diagram of the internal components of an example of a battery powered wall switch.

In order to perform the pairing and commissioning process and communicate with the luminaires 10A to 10N, examples of the wall switch 20 and sensor 21 for operation in the system 1 example of FIG. 1 also have wireless transmission/reception capabilities as well as a processor (e.g. in an MCU) or other control electronics. For example, as shown in the example of FIG. 4, a wall switch 20 includes a power distribution unit 312, MCU 204, and wireless transceivers 206 and 208, which are all somewhat similar to the various components shown in the luminaire of FIG. 3.

In addition, however, wall switch 20 includes an internal battery 302 that powers the electronics of the wall switch 20. Battery 302 is generally installed in wall switch 20 during manufacturing. Battery 302 may be any type of battery including an alkaline battery, nickel cadmium battery, lithium ion battery, etc. In addition to battery 302, wall switch 20 may also include at least one button 304 (e.g. push button, rocker switch, etc.) that allows a user to interact with the wall switch. Responses to actuation of the button 304 are supported by drive/sense circuitry 306 which interfaces button 304 to the MCU 204.

Optionally, the wall switch 20 may also include light emitting diodes (LEDs) 310 as well as LED driver circuitry 308 to support the LEDs. These LEDs may be used as pilot lights to allow wall switch 20 to output visual indicators to the user of the wall switch 20. For example, in a lighting control operational mode, a LED may be activated for a short time in response to a button press by a user. Before commissioning, activation of a LED in response to a button press shows an installer or other technician that the wall switch has power, is operational and/or is ready for commissioning.

Figure 5:
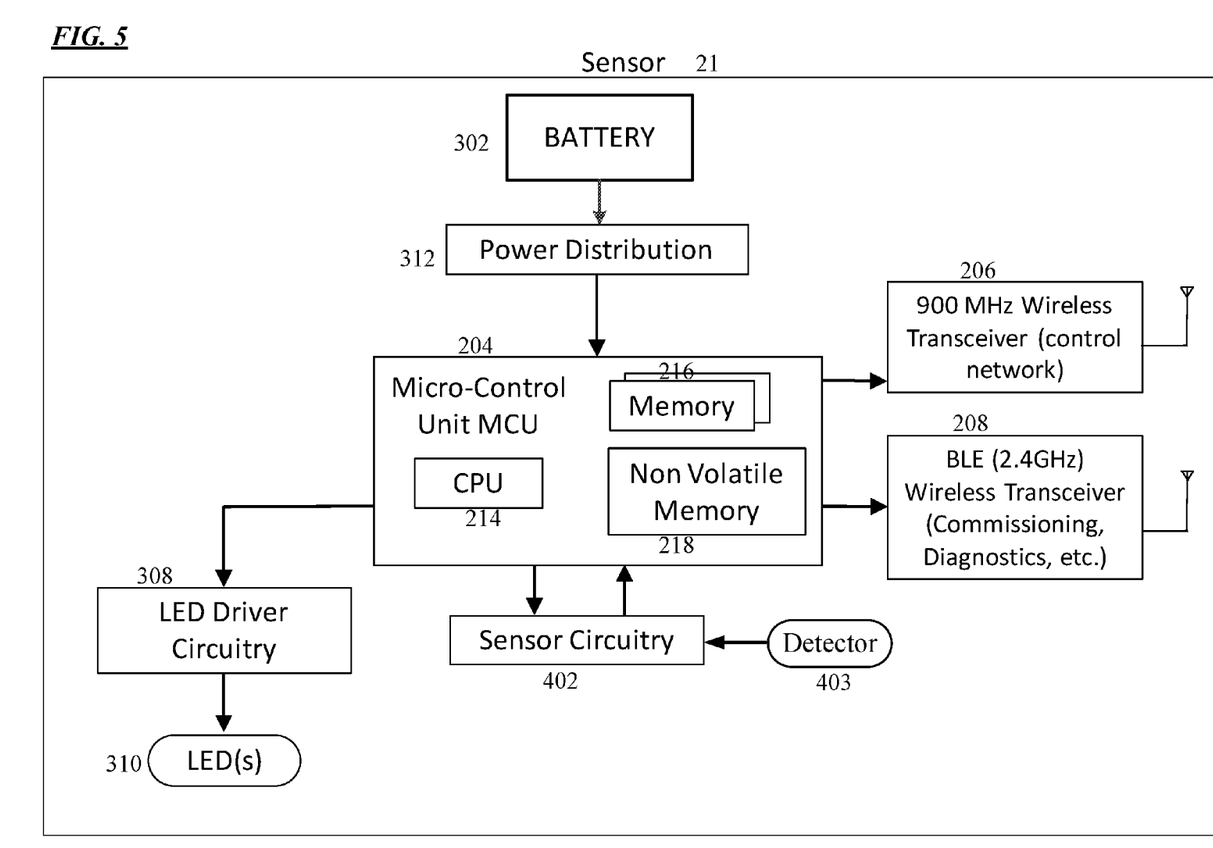
FIG. 5 shows a block diagram of the internal components of a battery powered sensor.

Sensor 21 shown in block diagram in FIG. 5 may be an occupancy sensor using a motion detector, that includes at least one of an infrared (IR) detector, an ultrasonic detector, or a microwave detector, an image detector, or the like. Although the system 1 may use similar sensor implementations for detection of other control responsive functions, e.g. detection of ambient light intensity or color characteristics, for purposes of further discussion of an example of the sensor 21, the description concentrates on a sensor 21 configured to detect motion.

The internal components of the sensor example are shown in FIG. 5 where sensor 21 includes several components similar to those of the wall switch 20. The similar components include a power distribution unit 312, MCU 204, wireless transceivers 206 and 208, internal battery 302, and possibly LEDs 310 and LED driver circuitry 308. However, sensor 21 also includes sensor circuitry 402 and an associated detector 403. The physical condition detector in the example is a device to generate a signal in response to detection of a particular stimulus condition, such as an Infrared or visible light sensitive photodiode for motion detection or the like. The sensor circuitry 402 includes electronics to operate and/or respond to output of the detector to provide appropriate information to the higher level logic, in this example of the MCU 204. As discussed above, in a motion sensor implementation, the detector 403 may include a particular type of motion sensor (IR photodiode or other IR detector, visible light photodiode or other visible light photocell, imager, etc.). The sensor circuitry 402 in turn provides any drive signals under control of the MCU 204 and formats any outputs from the particular motion detector for input to the MCU 204.

Similar to wall switch 20, battery 302 is installed in the sensor 21 during the manufacturing of the sensor.

Physical installation of the wall switch 20 and/or sensor 21 is performed by an installer (e.g., an electrician, a lay person, etc.) in a residential and/or commercial application. For example, assuming a luminaire 10 shown in FIG. 1 is installed in a particular area of a commercial store, the installer (store employee) may install at least one wall switch 20 and/or at least one sensor 21 in that particular area. The installation process could be performed by mounting the wall switch 20 and sensor 21 either directly to the wall (i.e., surface mount), or recessing wall switch 20 and/or sensor 21 into the wall or ceiling or the like (i.e., recessed mount). Since wall switch 20 and sensor 21 do not require external AC power (i.e. they are battery powered), a lay person could easily and safely perform the installation by screwing the physical wall switch 20 and/or sensor 21 to the wall (or any surface for that matter) using screws, bolts, adhesive backing, etc. In the example shown in FIG. 1, wall switch 20 may be mounted to the wall at a standard height of a conventional wall switch, and sensor 21 may be mounted on the wall at a height closer to the ceiling of the room or in the ceiling itself such that any movement in the particular area can be detected by sensor 21.

One benefit of this battery power conservation approach, over conventional techniques, is that each sensor 21 or wall switch 20 (upon manufacturing), already includes an internal battery which does not require a pull tab in order to ensure the battery life is not wasted. In order to ensure the life of battery 302, the wall switch 20 or the sensor 21 includes a power distribution unit 312 and/or appropriate programming of the MCU 204 that ensures that only minimal battery power is utilized when the device is not in use, and especially prior to the commissioning process (i.e. the time between manufacturing and installation and/or commissioning).

Essentially, the wall switch 20 and sensor 21 (upon being manufactured) are automatically entered into a "deep sleep" mode. This deep sleep mode provides minimal power (e.g., less than 5 micro-amps) to MCU 204 which essentially allows the MCU to determine if a button 304 has been pushed on the wall switch 20 or determine if motion has been detected by sensor circuitry 402. It should be noted, that during this deep sleep mode, power is not supplied to the RF transceivers, LEDs or any other non-essential electronics.

An example of the commissioning and control process of wall switch 20 will now be described in detail. Upon manufacturing, wall switch 20 initially operates in the deep sleep mode, thus consuming minimal power. Upon installation in a particular setting, wall switch 20 does not communicate with any other device, because it is still in the deep sleep mode. However, after receiving a stimulus (i.e., when a user pushes button 304), drive sense circuitry 306 of the wall switch sends a trigger signal to MCU 204. MCU 204 then sends a control signal to power distribution unit 312 in order to awake the device 20 from the deep sleep mode. This allows more power from battery 302 to be supplied not only to MCU 204 but also to other electronics within the wall switch such as the RF transceivers 206, 208 and any LEDs 310.

Upon awaking from the deep sleep mode, MCU 204 controls RF transceiver 208 to transmit an active beacon. Assuming use of BlueTooth for commissioning, the MCU 204 powers the BlueTooth transceiver, which sends an initial packet one or more times with a unique key. This beacon transmission may include the identity of the wall switch and effectively is a request to pair for another wireless device such as a commissioning device 25 to pair with the wall switch. Assuming a commissioning device 25 is in the vicinity of wall switch 20 at wake-up, the device 25 responds to the beacon signal; and an exchange of messages ensues in accordance with the BlueTooth protocol for pairing.

When the wall switch 20 is successfully paired with commissioning device 25, a commissioning process takes place. The commissioning process includes the exchange of other information between the devices. Upon successful commissioning, the wall switch 20 is now configured to control a luminaire 10. The commissioning process may be implemented in a variety of procedures using a variety of protocols, once the wall switch 20 is paired with the commissioning device 25. At a high level, the lighting control device 20 or 21 provides information about the device to the commissioning device 25, which the commissioning device 25 includes in a control group table that device 21 is e.g building for the group that will include the lighting control device 20 or 21. The commissioning device 25 provides to the lighting control device 20 or 21 any provisioning or configuration information that the device 20 or 21 may need to operate on the wireless control network as a control device of the particular group, such as the assigned RF channel and the identifier (ID) of the subscribed group channel that designates the lighting control group to which the lighting control device 20 or 21 will belong when the system is fully commissioned and operational.

Thus, wall switch 20 will enter a normal operations mode after commissioning. Unless activated for luminaire control, the wall switch 20 initial entry into the normal operations mode often will involve entry into a hiberanate state appropriate for normal lighting related operations in which the wall switch waits for further stimulus from the user. Different sleep or hibernate states/modes will have various peripherals of the integrated process powered off at various lower power levels for the device. In hiberanate, memory is refreshed, timers are running, and one or more pin inputs to the circuitry are active, for example, allowing the wall switch 20 to wake up on a button press detection. Other elements are powered down. The deep sleep mode used before commissioning may be the same mode or a similar mode with somewhat more or a somewhat less of the device operational. For example, the deep sleep mode may have the same components active as in the hibernate mode and/or have additional higher frequency oscillators available, as compared to the hibernate mode.

The stimulus from the user may be the user pressing the ON or OFF button on wall switch 20 in order to turn ON or OFF luminaire 10. Assuming the user pushes the ON button on wall switch 20, MCU 204 of wall switch 20 then instructs RF transceiver 206 to transmit a control signal to luminaire 10 and/or the luminaire designated as the group monitor. This control signal instructs luminaire 10 to turn ON light source 210. When the user wants to turn OFF luminaire 10, the user simply presses the OFF button on wall switch 20, at which point wall switch 20 instruct RF transceiver 206 to transmit another control signal to luminaire 10 and/or the luminaire designated as the group monitor instructing luminaire 10 to turn OFF light source 210. After performing these control functions, the wall switch 20 will reenter the normal sleep mode and await further stimulus from the user.

An example of commissioning sensor 21 and then controlling luminaire 10 will now be described in detail. As already described, when sensor 21 is manufactured it enters a deep sleep mode thus conserving battery power from battery 302. However, upon installation and receiving stimulus, MCU 204 of sensor 21 instructs power distribution unit 312 to supply the battery power 302 to other electronics such as RF transceivers 206, 208 and LEDs 310.

The stimulus of sensing in device 21 is somewhat different than by the wall switch 20, because sensor 21 may not have any buttons to press. The stimulus to sensor 21 may simply be that detector 403 sensor circuitry 402 sense motion in the vicinity of sensor 21 or a combination of motion along with some other stimulus. For example, if the device has multiple sensors, for example audio and motion sensors, a predetermined audio signal (e.g. tone, song, chirps, etc.) would be capable of waking up the device alone or in combination with detected motion. In a multiple sensor configuration, for example, the processor may be configured to awake the device from the deep sleep mode in response to a combination of the trigger signal from the sensor and a predetermined signal from the other sensor, or responsive to detection of either one or both of the predetermined audio signal or motion.

Thus, in the deep sleep mode, minimal power is provided to sensor circuitry 402 in order to detect motion. This motion that serves as the predetermined stimulus to wake up the device 21 for possible commissioning may be configured to be any motion, a specific pattern of motion (e.g. a particular movement about a room or a particular gesture, and/or motion for a specific amount of time), in order for the sensor circuitry 402 to send a trigger signal to MCU 204 which triggers the sensor 21 to awake from the deep sleep mode and begin beaconing.

Once sensor device 21 awakes from the deep sleep mode due to the trigger, MCU 204 controls BlueTooth transceiver 208 to transmit an active beacon. This active beacon is then received a commissioning device 25 and the two become paired. The sensor 21 and commissioning device 25 then perform the commissioning process where they exchange information between one another. After the commissioning process is completed successfully, sensor 21 is configured to control a luminaire 10.

During operation (after commissioning), sensor 21 may detect motion of a user within its vicinity. Once detector 403 and sensor circuitry 402 detect this motion, the circuitry 402 sends a trigger signal to MCU 204 which triggers MCU 204 to control RF transceiver 206 to send an appropriate control signal to luminaire 10 and/or the luminaire designated as the group monitor. The control signal sent to luminaire 10 may instruct luminaire 10 to turn ON light source 210 due to motion being detected in the vicinity (i.e., a person is in the room). After a certain amount of time, when detector 403 and sensor circuitry 402 do not detect any other motion in the vicinity, MCU 204 of sensor 21 may make a determination that the user has left the room. If this determination is made, MCU 204 instructs the RF transceiver 206 to send another control signal to luminaire 10 and/or the luminaire designated as the group monitor instructing luminaire 10 to turn OFF light source 210. At this point, the MCU 204 of sensor 21 enters the normal sleep mode and awaits further stimulus.

By manufacturing wall switch 20 and sensor 21 with an internal battery, an installer does not need to insert a battery into each of these devices upon installation. This minimizes installation time/cost and prevents users from stealing the batteries. In addition, by placing the sensor 21 and the wall switch 20 in the deep sleep mode upon manufacturing, an additional physical pull tab is not necessary. This reduces errors during installation as well as reduces manufacturing costs. Essentially, sensor 21 and wall switch 20 stay in a deep sleep mode where they consume very minimal battery power until awoken from the deep sleep mode by a stimulus. This stimulus is received through an interaction with these devices (i.e., pushing buttons on the wall switch, the sensor detecting motion in the room, etc.). This overall process ensures that the battery life of battery 302 and wall switch 20 and sensor 21 is extended as long as possible.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A battery powered wireless lighting control device, comprising:
   a battery;
   a processor;
   an radio frequency (RF) transceiver; and
   at least one of a detector or a button, wherein the button is for user activation, wherein the processor is configured to operate the lighting control device to:
   remain in a deep sleep mode that consumes minimal power from the battery until the processor receives a trigger signal from the detector or the button indicating a predetermined stimulus from a user,
   awake from the deep sleep mode to consume power from the battery when the trigger signal is received,
   perform wireless commissioning of the lighting control device by powering the RF transceiver and wirelessly transmitting a beacon to a commissioning device and wirelessly receiving a commissioning message from the commissioning device to enable the lighting control device to wirelessly communicate with a luminaire or other element of a wirelessly controlled lighting system, and
   provide wireless control of the luminaire through the RF transceiver after the commissioning is performed.

2. The lighting control device of claim 1, wherein the lighting control device is a wall switch that includes the button allowing a user to press the button to generate the trigger signal to wake the wall switch from the deep sleep mode, and once commissioned, to respond to user activation of the button to control lighting operation of the luminaire.

3. The lighting control device of claim 1, wherein:
   the lighting control device includes the detector and the detector is configured to detect motion;
   the lighting control device is configured as an occupancy sensor;
   the processor is configured to wake the occupancy sensor from the deep sleep mode upon motion detection, and once commissioned, to control the luminaire to turn ON based on further detected motion.

4. The lighting control device of claim 3, further comprising:
   another sensor,
   wherein the processor is further configured to awake the lighting control device from the deep sleep mode in response to either one or a combination of the trigger signal from the sensor or a predetermined signal from the other sensor.

5. The lighting control device of claim 1, wherein the processor is further configured to keep the lighting control device in the deep sleep mode from manufacturing of the lighting control device.

6. The lighting control device of claim 1, wherein the processor is further configured to transition the lighting control device back to the deep sleep mode when a wake-up fails to result in a successful commissioning of the lighting control device.

7. The lighting control device of claim 1, wherein the processor is further configured to transition the lighting control device back to the deep sleep mode at a predetermined time interval after wake-up in event of no commissioning of the lighting control device before expiration of the predetermined time interval.

8. The lighting control device of claim 1, wherein:
   upon awakening from the deep sleep mode, the processor and the RF transceiver consume battery power necessary to complete the commissioning of the lighting control device; and
   upon successful commissioning of the lighting control device, the lighting control device including the processor and the RF transceiver, enters normal mode awaiting a lighting related input via the detector or the button.

9. The lighting control device of claim 1, wherein the minimal power consumed in the deep sleep mode is less than or equal to 5 micro-amperes of electrical current.

10. A battery powered wireless wall switch for lighting control, comprising:
    a battery;
    a processor;
    an radio frequency (RF) transceiver; and
    a button for user activation,
    wherein the processor is configured to operate the wall switch to:
    before commissioning for normal operation, remain in a deep sleep mode that consumes minimal power from the battery until the processor receives a trigger signal from the button,
    awake from the deep sleep mode to consume power from the battery when the trigger signal is received,
    perform wireless commissioning of the wall switch by powering the RF transceiver and wirelessly transmitting a beacon to a commissioning device and wirelessly receiving a commissioning message from the commissioning device to enable the wall switch to wirelessly communicate with a luminaire or other element of a wirelessly controlled lighting system, and provide a normal operations mode for wireless control of the luminaire through the RF transceiver, after the commissioning is performed.

11. The wall switch of claim 10, further comprising:
another button, wherein:
one of the buttons is an ON button and the other of the buttons is an OFF button, and
the processor is configured to wake the wall switch from the deep sleep mode in response to user activation of one or the other of the buttons and to control state of the luminaire after the commissioning in response to user activations of the buttons.

12. The wall switch of claim 10, wherein the wall switch is configured for surface mounting on or recessed mounting in a wall of a premises to be illuminated by the lighting system.

13. The wall switch of claim 10, wherein the processor is further configured to keep the wall switch in the deep sleep mode from manufacturing of the wall switch.

14. The wall switch of claim 10, wherein the processor is further configured to transition the wall switch back to the deep sleep mode at a predetermined time interval after wake-up in event of no commissioning of the wall switch before expiration of the predetermined time interval.

15. The wall switch of claim 10, wherein:
upon awakening from the deep sleep mode, the processor and the RF transceiver consume battery power necessary to complete the commissioning of the wall switch; and
upon successful commissioning of the wall switch, the wall switch including the processor and the RF transceiver, enters a low-power sleep mode awaiting a lighting related input via the button.

16. A battery powered wireless occupancy sensor for lighting control, comprising:
a battery;
a processor;
an radio frequency (RF) transceiver; and
a detector configured to detect motion,
wherein the processor is configured to operate the occupancy sensor to:
before commissioning for normal operation, remain in a deep sleep mode that consumes minimal power from the battery until the processor receives a trigger signal indicating the detector has detected a predetermined stimulus from a user, awake from the deep sleep mode to consume power from the battery when the trigger signal is received, perform wireless commissioning of the occupancy sensor by powering the RF transceiver and wirelessly transmitting a beacon to a commissioning device and wirelessly receiving a commissioning message from the commissioning device to enable the wireless occupancy sensor to wirelessly communicate with a luminaire or other element of a wirelessly controlled lighting system, and provide a normal operations mode for wireless control of the luminaire through the RF transceiver after the commissioning is performed in response to sensing of occupancy via the detector.

17. The occupancy sensor of claim 16, wherein the detector comprises at least one of an infrared (IR) detector, an ultrasonic detector, a microwave detector, or a video camera.

18. The occupancy sensor of claim 16, wherein the occupancy sensor is configured for surface mounting on or recessed mounting in a wall or other architectural panel of a premises to be illuminated by the lighting system.

19. The occupancy sensor of claim 16, wherein the processor is further configured to keep the occupancy sensor in the deep sleep mode from manufacturing of the occupancy sensor.

20. The occupancy sensor of claim 16, wherein the processor is further configured to transition the occupancy sensor back to the deep sleep mode at a predetermined time interval after wake-up in event of no commissioning of the occupancy sensor before expiration of the predetermined time interval.

21. The occupancy sensor of claim 16, wherein:
upon awakening from the deep sleep mode, the processor and the RF transceiver consume battery power necessary to complete the commissioning of the occupancy sensor; and
upon successful commissioning of the occupancy sensor, the occupancy sensor including the processor and the RF transceiver, enters a low-power sleep mode awaiting sensing of an occupancy related condition via the detector.

* * * * *